United States Patent [19]

Shirato

[11] Patent Number: 4,858,268

[45] Date of Patent: Aug. 22, 1989

[54] WINDSHIELD WIPER DEVICE FOR USE IN VEHICLES

[75] Inventor: Masayoshi Shirato, Kiryu, Japan

[73] Assignee: Mitsuba Electric Mfg. Co., Ltd., Gumma, Japan

[21] Appl. No.: 206,582

[22] Filed: Jun. 14, 1988

[30] Foreign Application Priority Data

Jun. 15, 1987 [JP] Japan .............................. 62-91722[U]

[51] Int. Cl.$^4$ ............................................... B60S 1/34
[52] U.S. Cl. ................................ 15/250.21; 15/250.35
[58] Field of Search ........... 15/250.21, 250.23, 250.35, 15/250.34, 250.33

[56] References Cited

U.S. PATENT DOCUMENTS

| | | | |
|---|---|---|---|
| 2,691,186 | 10/1954 | Oishei et al. | 15/250.21 |
| 3,012,266 | 12/1961 | Reister et al. | 15/250.21 |
| 3,292,200 | 12/1966 | Scinta . | |
| 4,800,610 | 1/1989 | Arai et al. | 15/250.21 |

FOREIGN PATENT DOCUMENTS

| | | | |
|---|---|---|---|
| 1072497 | 12/1959 | Fed. Rep. of Germany ... | 15/250.21 |
| 790284 | 2/1958 | United Kingdom . | |
| 853516 | 11/1960 | United Kingdom . | |

Primary Examiner—Peter Feldman
Attorney, Agent, or Firm—Darby & Darby

[57] ABSTRACT

There is disclosed a windshield wiper device for wiping the window glass of an automotive vehicle. The windshield wiper includes: an arm head, a retainer, an arm spring, and a wiper blade. The arm head is adapted to be fixed to the wiper shaft of the vehicle so as to oscillate about an axis of oscillation. The retainer is pivotally connected to the arm head for movement about a pivot axis extending perpendicularly to the axis of oscillation. The arm spring is interposed between the arm head and the retainer member to urge the retainer member toward the window glass upon the fixation of the arm head to the wiper shaft. The arm piece is disposed perpendicularly to the pivot axis and is rotatably connected to the retainer member for movement about the longitudinal axis of the arm piece. The wiper blade is connected to the arm piece so as to be pressed against the window glass by the arm spring upon the fixation of the arm head to the wiper shaft. The wiper blade squeegees the window glass when the arm head is oscillated. The wiper device further includes a mechanism for converting the pivotal movement of the retainer into the rotational movement of the arm piece so that, when the retainer is pivoted about the pivot axis, the wiper blade is turned about the longitudinal axis of the arm piece.

10 Claims, 5 Drawing Sheets

FIG.1 (PRIOR ART)  FIG.2 (PRIOR ART)
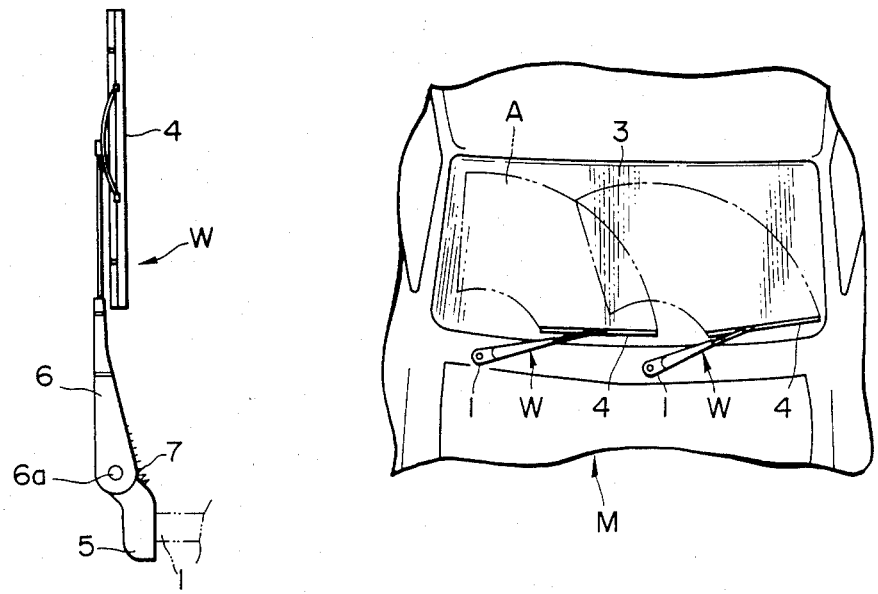
FIG.3 (PRIOR ART)
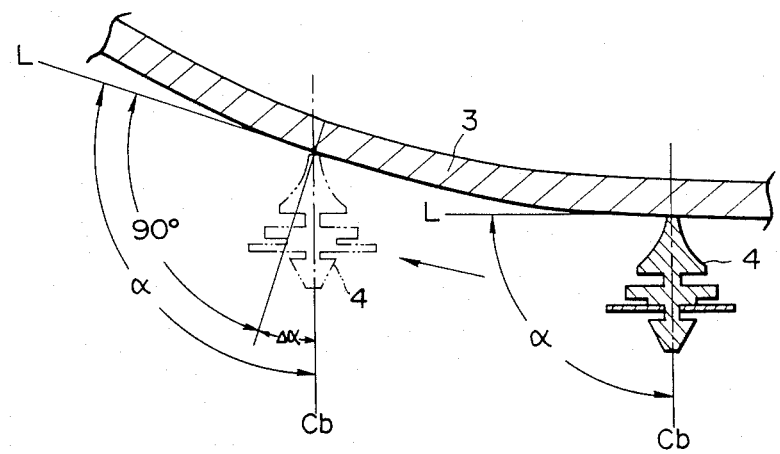

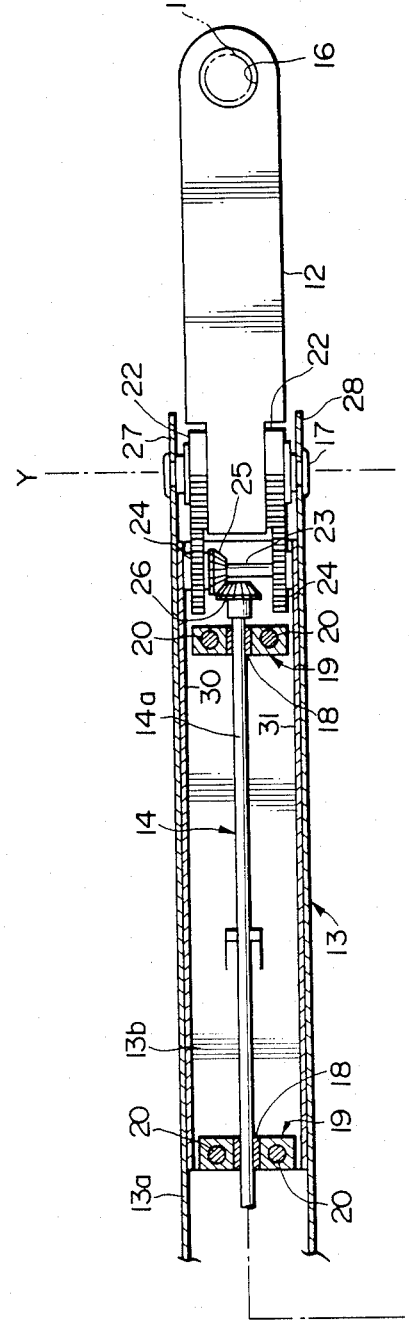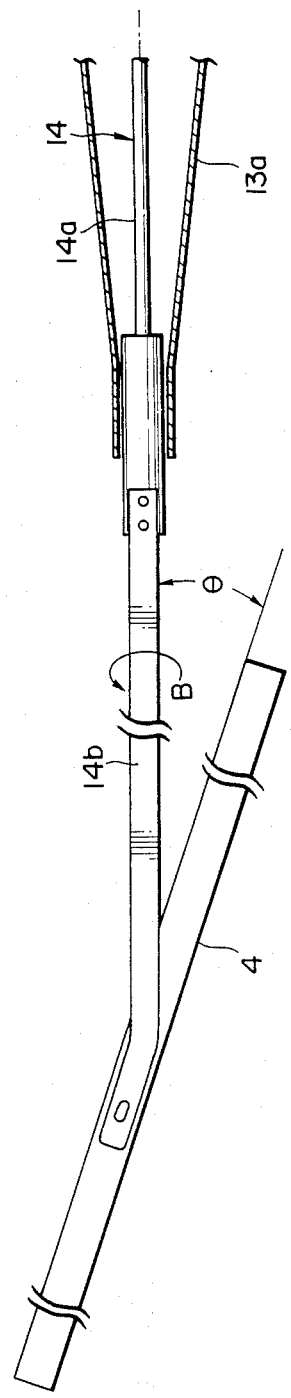
FIG. 4

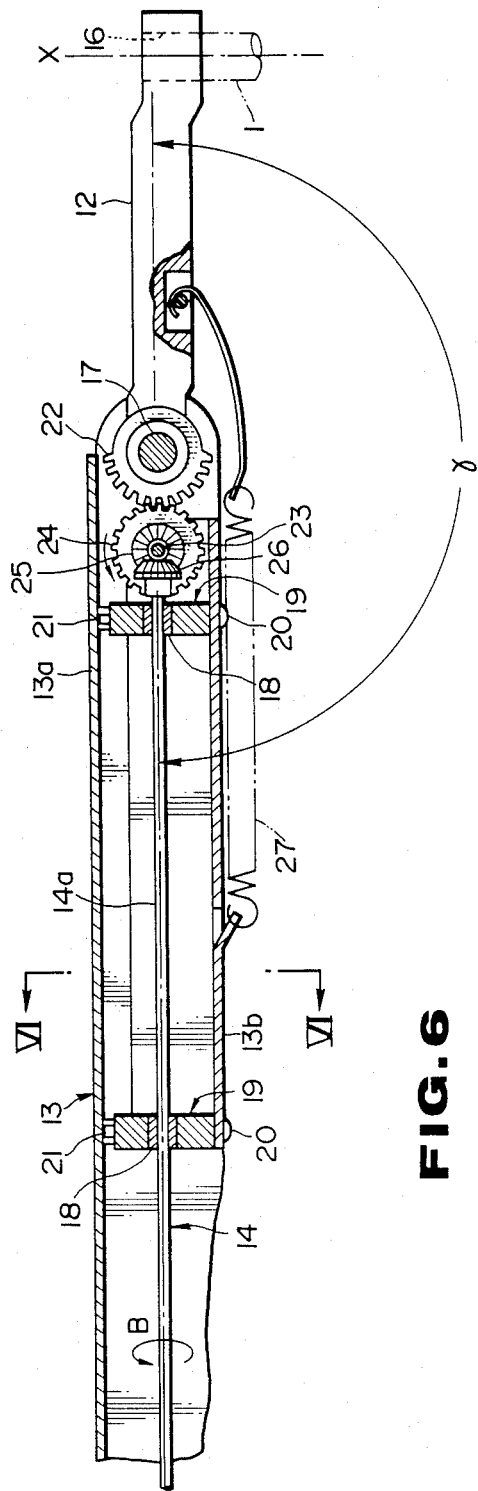
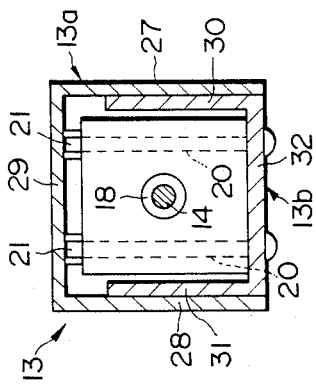
FIG. 5
FIG. 6

WINDSHIELD WIPER DEVICE FOR USE IN VEHICLES

BACKGROUND OF THE INVENTION

This invention relates to a windshield wiper device used for wiping rainwater, snow, mud, dust or any other dirt off the window glass of a vehicle such as automobile, bus, truck and the like.

FIGS. 1 and 2 illustrate a typical example of a conventional windshield wiper device W which is used for wiping the front window glass, i.e., the windshield of an automobile. This wiper device W includes: an arm head 5; a retainer 6 pivotally connected at its proximal end to the arm head 5 for right and left movement as viewed in FIG. 1; an arm spring 7 interconnecting the retainer 6 with the arm head 5 so as to urge the retainer 6 to the right; and an elongated wiper blade 4 connected to the distal end of the retainer 6 so as to extend substantially parallel to the retainer 6. Such a wiper device W is adapted to be mounted on the automobile M as shown in FIG. 2 and to be oscillated, for example, in tandem manner along the outer surface of the windshield 3. More specifically, the arm head 5 is to be fixedly connected to a wiper shaft 1 below the windshield 3 in such a manner that the wiper blade 4 is pressed against the outer surface of the windshield 3 by the arm spring 7. The wiper shaft 1 is drivingly connected through a linkage to an electric motor (not shown) which is installed in the automobile M, and thereby, when the motor is turned on, the wiper device W is oscillated so that the wiper blade 4 squeegees an area A of the windshield 3 shown by the phantom line in FIG. 2. In the case that the outer surface of the windshield 3 is convexly curved as shown in FIG. 3 or slanted to a plane perpendicular to the longitudinal axis of the automobile M, the retainer 6 is pivoted about its pivot shaft 6a during the oscillation of the wiper device W. Therefore, the entire wiper blade 4 is constantly kept in contact with the outer surface of the windshield 3.

However, when the curvature of the windshield's outer surface exceeds a predetermined value, there arises a problem during the oscillation of the wiper blade 4, of the angle $\alpha$ between the centerline Cb of the wiper blade's cross section and the tangent line L to that point on the windshield 3 which the wiper blade 4 contacts, being increased or decreased to a value inconveniently far from the ideal angle of 90° (see phantom line in FIG. 3). As a result, the wiper blade 4 neither smoothly oscillates along the windshield 3 nor effectively squeegees the windshield 3, and furthermore, a chattering noise is occasionally generated due to the unsmooth oscillation of the wiper blade 4. Such a problem tends to be aggravated by both the diversification of modern vehicles' designs and the improvements made in the aerodynamical characteristics of modern vehicles. In addition, the difference $\Delta\alpha$ between the angle $\alpha$ and the ideal angle is called the error angle. The maximum permissible error angle of a wiper blade varies depending on both the elastic modulus of the arm spring and the material and shape of the wiper blade, however, it is, generally, about 8°.

SUMMARY OF THE INVENTION

Accordingly, it is an object of the present invention to provide a windshield wiper device in which, regardless of the curvature of a window glass, the error angle of a wiper blade is held within the permissible value.

Another object of the present invention is to provide a windshield wiper device which shows an excellent wiping performance and smooth oscillation on a curved window glasses.

With these and other objects in view, the present invention provides a windshield wiper device including: an arm head, a retainer, an arm spring, and a wiper blade. The arm head is adapted to be fixed to the wiper shaft of the vehicle so as to oscillate about an axis of oscillation. The retainer is pivotally connected to the arm head for movement about a pivot axis extending perpendicularly to the axis of oscillation. The arm spring is interposed between the arm head and the retainer member to urge the retainer member toward the window glass upon the fixation of the arm head to the wiper shaft. The arm piece is disposed perpendicularly to the pivot axis and is rotatably connected to the retainer member for movement about the longitudinal axis of the arm piece. The wiper blade is connected to the arm piece so as to be pressed against the window glass by the arm spring upon the fixation of the arm head to the wiper shaft. The wiper device further includes a mechanism for converting the pivotal movement of the retainer into the rotational movement of the arm piece.

When the retainer is pivoted about the pivot axis due to the curvature of the window glass, the wiper blade is turned about the longitudinal axis of the arm piece. Therefore, by controlling the turning angle and turning direction of the wiper blade properly according to the curvature of the window glass, the error angle of the wiper blade is prevented from increasing to a value more than the maximum permissible error angle. Accordingly, this windshield wiper device shows an excellent wiping performance and smooth oscillation on curved window glasses, thereby restraining the generation of a chattering noise during the oscillation.

The converting means may include: a first gear member fixedly disposed on the arm head in coaxial relation to the pivot axis; and a first bevel gear coaxially and fixedly disposed on the arm piece and operatively connected to the first gear member.

The first gear member may be a second bevel gear meshed with the first bevel gear. Alternatively, the converting means may further include: a second gear member meshed with the first gear member and rotatably held by the retainer for rotation about an axis parallel to the pivot axis; and a second bevel gear coaxially and fixedly connected to the second gear member and meshed with the first bevel gear. In this alternative case, each of the first and second gear members may be a spur gear or a helical gear. In the both cases, when the curvature of the window glass is constant, the turning angle of the wiper blade may be controlled properly by adjusting the gear ratio between the gears. The turning direction of the wiper blade may be controlled by changing the arrangement of the gears.

BRIEF DESCRIPTION OF THE DRAWINGS

In the drawings:

FIG. 1 is a side-elevational view of a conventional windshield wiper device;

FIG. 2 is a fragmentary front view of an automobile on which the wiper device in FIG. 1 is mounted;

FIG. 3 is a cross-sectional view of a wiper blade of the wiper device in FIG. 1, showing the wiper blade pressed against the windshield of the automobile;

FIG. 4 is a front view, partly in section, of a windshield wiper device according to the present invention;

FIG. 5 is a fragmentary side-elevational view, partly in section, of the wiper device in FIG. 4;

FIG. 6 is a view taken along the line VI—VI of FIG. 5;

DETAILED DESCRIPTION OF THE PREFERRED EMBODIMENTS

Figure 7:
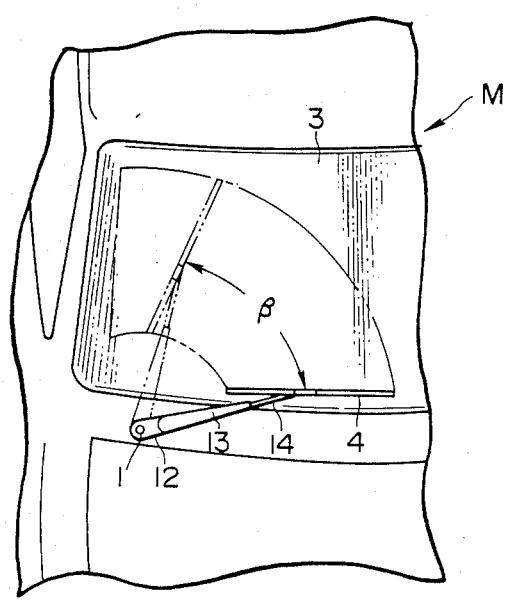
FIG. 7 is a fragmentary front view of an automobile on which the wiper device in FIG. 4 is mounted.

FIGS. 4 to 6 illustrate a windshield wiper device according to the present invention, in which reference numeral 12 designates a rectangular bar-like arm head adapted to be fixedly connected to a wiper shaft 1 of an automobile. This arm head 12 has a circular through hole 16, extending transversely through the proximal end portion of the arm head 12, for receiving the wiper shaft 1. The arm head 12 also has a pivot shaft 17 fixed to and passing transversely through the distal end portion of the arm head 12 so that the opposite end portions of the pivot shaft 17 project from the arm head 12 in a direction generally perpendicular to the axis X (see FIG. 5) of the through hole 16, i.e., the axis of oscillation. A substantially tubular retainer 13 is connected to the distal end portion of the arm head 12. This retainer 13 includes outer and inner mated channel-like members 13a and 13b. The outer member 13a is pivotally connected at its proximal end to the pivot shaft 17 in such a manner that the pivot shaft 17 bridges the distance between the opposite side walls 27 and 28 (see FIG. 6) of the outer member 13a. On the other hand, the inner member 13b fits in the outer member 13a so as to form the retainer 13 of a tubular construction. An arm spring in the form of a coil spring 27 interconnects the retainer 13 with the arm head 12 so as to urge the retainer 13 downward as viewed in FIG. 5. That is, one of the opposite ends of the coil spring 27 is fastened to the bottom wall 32 of the inner member 13b, while the other end of the coil spring 27 is fastened to the arm head 12.

Referring further to FIGS. 4 and 5, a pair of spacer members 19 and 19 are received in the retainer 13 at an longitudinal interval. Each of the spacer members 19 is interposed between the outer and inner members 13a and 13b so as to retain a predetermined distance between the bottom walls 29 and 32 of the respective outer and inner members 13a and 13b. These spacer members 19 are secured to both the outer and inner members 13a and 13b by screws 20, each passing through both the inner member's bottom wall 32 and the corresponding spacer member 19. The distal ends of the screws 20 are threadedly engaged with nuts 21 which are welded to the inner face of the outer member's bottom wall 29. Further more, each spacer member 19 includes a bearing member in the form of a bushing 18 passing therethrough along the longitudinal axis of the retainer 13. The bushings 18 of the respective spacer members 19 are disposed coaxially with each other.

Figure 8:
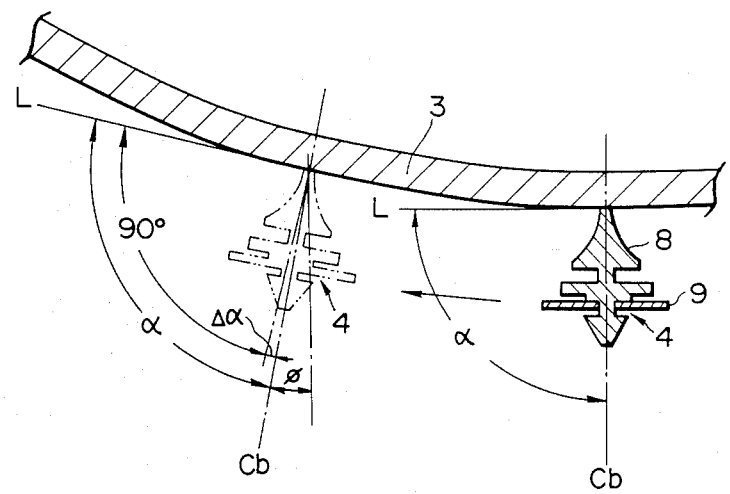
FIG. 8 is a cross-sectional view of a wiper blade of the device in FIG. 4, showing the wiper blade pressed against the windshield of the automobile.

As shown in FIG. 4, an elongated arm piece 14 is inserted into the retainer 13 so as to be disposed perpendicular to the axis Y of the pivot shaft 17, i.e., the pivot axis. This arm piece 14 consists of; a round rod-like inner end portion 14a disposed within the retainer 13; and a slat-like outer end portion 14b projecting outward from the distal end of the retainer 13. The inner end portion 14a of the arm piece 14 is coaxially received in both the bushes 18 and 18 of the spacer members 19 and 19 so that the arm piece 14 is rotatable about its axis with respect to the retainer 13. The proximal end of the inner end portion 14a is disposed adjacent to the distal end of the arm head 12. The distal end of the outer end portion 14b is slightly bent with respect to the rest of the arm piece 14 and is fixedly connected to an elongated wiper blade 4. As a result, the wiper blade 4 inclines to the axis of the arm piece 14 at a slight angle $\theta$. In addition, as shown in FIG. 8, the wiper blade 4 includes an elongated blade rubber 8 and a slat-like backing member 9 disposed along the blade rubber 8 to support the blade rubber 8.

Returning to FIG. 4, a pair of spur gears 22 and 22 are coaxially fixed respectively to the opposite end portions of the pivot shaft 17 so that each gear 22 is positioned between the arm head 12 and the corresponding side wall 27 or 28 of the outer member 13a. A rotation shaft 23 is rotatably held by the inner member 13b so as to extend between the opposite side walls 30 and 31 of the inner member 13b. More specifically, the rotation shaft 23 is disposed parallel to the pivot shaft 17 at the position between the pivot shaft 17 and the proximal end of the arm piece's inner end portion 14a. A pair of pinions 24 and 24 which are also spur gears, are coaxially and fixedly disposed on the rotation shaft 23, and are meshed with the gears 22 and 22 respectively. A bevel gear 25 is also coaxially and fixedly disposed on the rotation shaft 23, and meshed with another bevel gear 26 which is coaxially fixed to the proximal end of the arm piece's inner end portion 14a. Consequently, when the retainer 13 is pivoted about the pivot shaft 17, the rotation shaft 23 is turned due to the engagement between the gears 22 and the pinions 24, resulting in the rotation of the arm piece 14. That is, the rotation shaft 23 and the gears 22, 24, 25 and 26 constitute a mechanism for converting the pivotal movement of the retainer 13 into the rotational movement of the arm piece 14.

To use the windshield wiper device mentioned above, the wiper device is mounted, for example, on an automobile M having a convexly curved windshield 3 as shown in FIG. 7. More specifically, the wiper shaft 1 of the automobile M is inserted into the through hole 16 of the arm head 12 as shown by the phantom line in FIG. 5, and the arm head 12 is secured to the wiper shaft 1 by suitable fastening means such as bolts and screws. As a result, the retainer 13 is urged toward the windshield 3 by the coil spring 27, and the wiper blade 4 is pressed against the outer face of the windshield 3 as shown in FIG. 8. Then, the wiper blade 4 is brought to its initial position as shown by the solid line in FIG. 7, and the angle $\alpha$, between the centerline Cb of the wiper blade 4 and the tangent line L to the windshield 3 is adjusted to about 90° as shown by the solid line in FIG. 8. After that, the wiper device is ready to wipe the windshield 3.

The wiper device thus mounted on the automobile M, is oscillated by driving the wiper shaft 1, thereby transversely moving the wiper blade 4 along the convex outer surface of the windshield 3. As the wiper blade 4 moves from the position shown by the solid line in FIGS. 7 and 8 to the position shown by the phantom line, the retainer 13 is pivoted upward as viewed in FIG. 8 due to the curvature of the windshield 3, causing the arm piece 14 to turn in a direction indicated by the arrow B in FIGS. 4 and 5. This turning of the arm piece 14 results in the clockwise turning at an angle $\phi$ of the wiper blade 4 as viewed in FIG. 8, which prevents the error angle of the wiper blade 4 from inconveniently increasing. More specifically, although the error angle of a conventional device's wiper blade is assumed to increase to an angle $\phi + \Delta\alpha$, the error angle of the wiper blade 4 is restricted to an angle $\Delta\alpha$ since the wiper blade 4 turns clockwise at the angle $\phi$. The turning angle $\phi$ of the wiper blade 4 is in proportion to the pivoting angle of the retainer 13, and varies depending on the gear ratio between the gears such as the bevel gears 25 and 26 and the gears 22 and 24. The pivoting angle of the retainer 13 varies depending on the curvature of the windshield 3. Accordingly, when the curvature of the windshield 3 is constant, it is possible, by adjusting the gear ratio, to control the turning angle $\phi$ of the wiper blade 4 so that the error angle $\Delta\alpha$ of the wiper blade 4 is restricted to a value less than the maximum permissible error angle. In order to cause the wiper blade 4 to turn counterclockwise, the arrangement of the bevel gear 25 may be changed. That is, by rearranging the bevel gear 25 so that it tapers upward as viewed in FIG. 4, it is possible to cause the wiper blade 4 to turn counterclockwise.

Although in the foregoing embodiment, the wiper device is used for wiping the windshield 3 of an automobile M, it should be readily apparent that it may also be used for the rear window glass of the automobile or for the front or rear window glasses of other types of vehicles. In place of the spur gears 22 and 24, helical gears may be employed. Alternatively, in place of both the rotation shaft 23 and the gears 22, 24 and 25, a bevel gear coaxially fixed to the pivot shaft 17 and directly meshed with the bevel gear 26 may be employed. Furthermore, instead of the gears 22, gears directly fixed to the arm head 12 may be used. In this case, the pivot shaft 17 may be rotatably connected to the arm head 12 for movement about its axis, and thus, the pivot shaft 17 may be fixed to the retainer 13.

Measuring tests, given to the wiper devices, for measuring the error angle, are now described hereunder.

EXAMPLE 1

Figure 9:
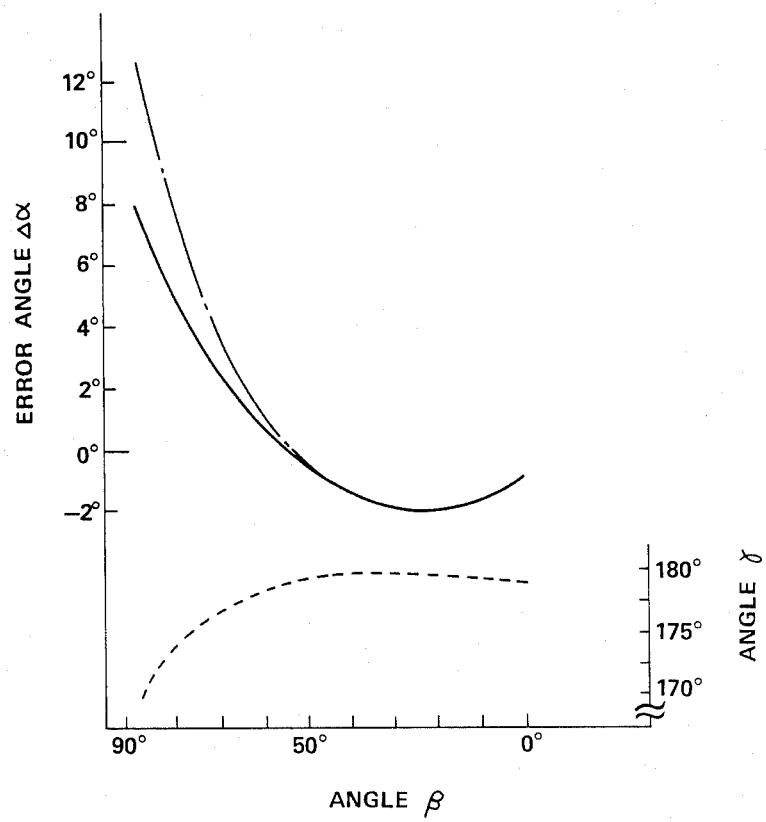
FIG. 9 is a graph showing the relationship between the error angle of the wiper blade in FIG. 8 and the angle of the wiper blade with respect to the initial position of the wiper blade as well as the relationship between the angle of the retainer with respect to the arm head and the angle of the wiper blade with respect to the initial position of the wiper blade.

A test wiper device equivalent to the foregoing embodiment shown in FIGS. 4 to 6 was mounted on an automobile having a convexly curved windshield. The wiper blade was brought to its initial position on the windshield, and the angle between the centerline of the blade and the tangent line to the windshield was adjusted to approximately 90°. After that, the wiper blade was transversely and intermittently moved along the outer surface of the windshield, and every time the wiper blade stopped, the error angle of the blade together with the pivoting angle of the retainer were measured. The results are shown in FIG. 9, in which the axis of abscissa represents the angle $\beta$ of the wiper blade with respect to the initial position of the blade (see FIG. 7), the right axis of ordinate represents the angle $\gamma$ of the retainer with respect to the arm head (see FIG. 5), and the left axis of ordinate represents the error angle $\Delta\alpha$ defined by the following equation:

$$\Delta\alpha = \alpha - 90°$$

where $\alpha$ is the angle between the centerline of the wiper blade and the tangent line to the windshield. The curve shown by the solid line in FIG. 9 represents the relationship between the error angle $\Delta\alpha$ and the angle $\beta$. The curve shown by the broken line in FIG. 9 represents the relationship between the angle $\beta$ and the angle $\gamma$.

COMPARATIVE EXAMPLE

A test wiper device having an arm piece fixed to a retainer, was mounted to the same automobile used in Example 1, and the error angle of the blade was measured in the same manner as measured in Example 1. The results are shown by the dashed line in FIG. 9.

As shown in FIG. 9, it will be understood that even though a windshield on which the wiper device of the present invention is to be used, is of a curvature which causes the error angle of a conventional wiper device to increase to a value more than the maximum permissible error angle of 8°, the error angle of the wiper device according to the present invention is restricted to a value less than 8°.

What is claimed is:

1. A windshield wiper device adapted to be mounted on the wiper shaft of an automotive vehicle to wipe the window glass of the vehicle, the windshield wiper comprising:
    an arm head adapted to be fixed to the wiper shaft of the vehicle so as to be oscillated about an axis of oscillation;
    a retainer member pivotally connected to the arm head for movement about a pivot axis extending in a direction perpendicular to the axis of oscillation;
    an arm spring, interposed between the arm head and the retainer member, for urging the retainer member toward the window glass upon the fixation of the arm head to the wiper shaft;
    an arm piece disposed perpendicularly to the pivot axis and rotatably connected to the retainer member for movement about the longitudinal axis of the arm piece;
    a wiper blade connected to the arm piece so as to be pressed against the window glass by the arm spring upon the fixation of the arm head to the wiper shaft, the wiper blade squeegeeing the window glass upon the oscillation of the arm head; and
    means, interposed between the arm head and the arm piece, for converting the pivotal movement of the retainer into the rotational movement of the arm piece so that, when the retainer is pivoted about the pivot axis, the wiper blade is turned about the longitudinal axis of the arm piece.

2. A windshield wiper device according to claim 1, wherein the converting means comprises: a first gear member fixedly disposed on the arm head in such a manner that the first gear member is coaxial with the pivot axis; and a first bevel gear coaxially and fixedly disposed on the arm piece and operatively connected to the first gear member.

3. A windshield wiper device according to claim 2, wherein the first gear member is a second bevel gear meshed with the first bevel gear.

4. A windshield wiper device according to claim 2, wherein the converting means further comprises: a second gear member rotatably held by the retainer for rotation about an axis parallel to the pivot axis, the second gear member being meshed with the first gear member; and a second bevel gear coaxially and fixedly connected to the second gear member and meshed with the first bevel gear.

5. A windshield wiper device according to claim 4, wherein each of the first and second gear members is a spur gear.

6. A windshield wiper device according to claim 4, wherein each of the first and second gear members is a helical gear.

7. A windshield wiper device according to claim 3 or 4, wherein the arm piece includes proximal and distal end portions, wherein the retainer is of a substantially tubular construction having first and second ends, the first end being pivotally connected to the arm head for said pivotal movement of the retainer, the retainer extending along the arm head and receiving the proximal end portion of the arm piece, the distal end portion of the arm head projecting outward from the second end of the retainer, and wherein the wiper blade is connected to the distal end portion of the arm piece.

8. A windshield wiper device according to claim 7, wherein the retainer comprises: outer and inner channel-like members mated with each other to form the substantially tubular construction.

9. A windshield wiper device according to claim 7, wherein the converting means is disposed substantially within the retainer.

10. A windshield wiper device according to claim 7, wherein the retainer has a plurality of bearing members, disposed therewithin at axial intervals, for receiving the proximal end portion of the arm piece.

* * * * *